UNITED STATES PATENT OFFICE.

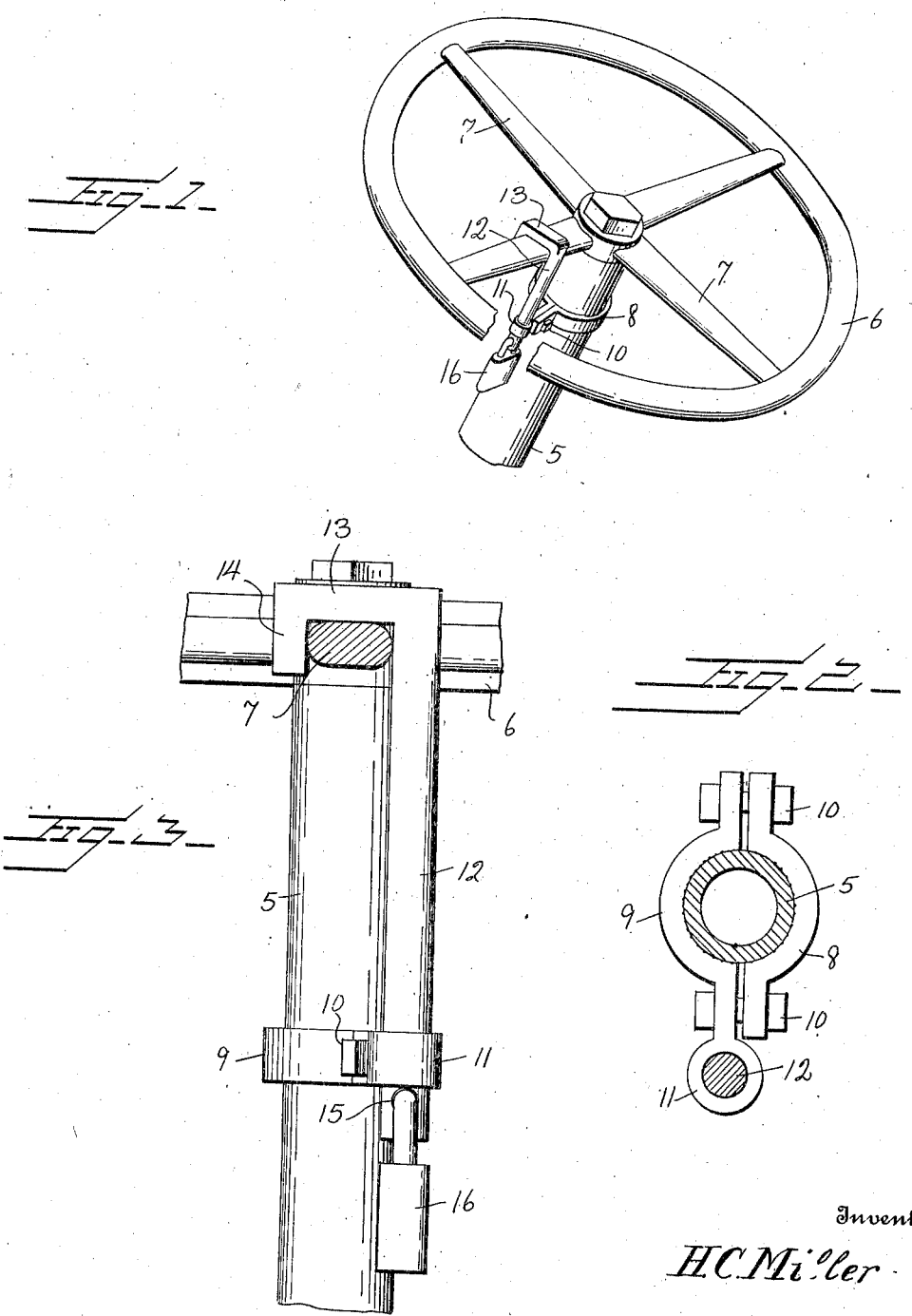

HIRAM C. MILLER, OF PARKESBURG, PENNSYLVANIA.

LOCKING DEVICE FOR STEERING-WHEELS.

1,303,354. Specification of Letters Patent. Patented May 13, 1919.

Application filed June 12, 1918. Serial No. 239,603.

*To all whom it may concern:*

Be it known that I, HIRAM C. MILLER, a citizen of the United States, residing at Parkesburg, in the county of Chester and State of Pennsylvania, have invented certain new and useful Improvements in Locking Devices for Steering-Wheels, of which the following is a specification, reference being had to the accompanying drawings.

This invention relates to an improved locking device for steering wheels, and has for its primary object to provide a simply constructed and easily operated device for locking the steering wheel of an automobile so that the vehicle cannot be operated by unauthorized persons.

It is another and more particular object of the invention to provide a device for the above purpose embodying a guide member and means for securing the same upon the steering post, a locking rod movable in the guide member, an angular end portion to engage one of the spokes of the steering wheel, and means adapted to be connected to the other end of said rod to prevent movement of the same from its locking position with respect to the guide.

It is also a further object of my invention to provide a device for the above purpose consisting of relatively few simply constructed parts so that the device as a whole may be manufactured at relatively small cost, and can be easily and quickly applied to the ordinary motor vehicle without necessitating any structural alterations therein.

With the above and other objects in view, the invention consists in the improved combination, construction and relative arrangement of the several parts as will be hereinafter more fully described, subsequently claimed and illustrated in the accompanying drawing, in which similar reference characters designate corresponding parts throughout the several views, and wherein:—

Figure 1 is a perspective view illustrating the upper end of the vehicle steering post and the wheel with my improved locking device applied thereto;

Fig. 2 is a horizontal sectional view; and

Fig. 3 is a vertical section through one of the wheel spokes showing the locking device engaged therewith.

Referring in detail to the drawing, 5 designates the steering post of the vehicle and 6 the usual steering wheel at the upper end thereof, which is suitably attached to the rod or shaft rotatably mounted in said post. This wheel is provided with the usual radiating arms or spokes 7.

My improved locking device includes complementary clamping members 8 and 9 respectively, each of which is formed with a semi-circular portion to engage on one side of the post 5, said post being detachably connected by means of the clamping bolts, indicated at 10. The member 9 at one of its ends terminates in a guide eye or loop 11.

A locking device, which is in the form of a cylindrical member, is provided. This locking member may be constructed from any suitable material, and in such wise as to have strength and rigidity, in order to render it less apt to become distorted or bent, incident to endeavoring to turn the steering wheel, by exercising considerable force or a wrenching action. Strength and rigidity are necessary, particularly from a commercial point of view, so as to render the device more positive, and this being the case, a device of this kind would be more apt to be adopted and at the same time would be a salable article, and moreover demands for such an article would no doubt occur. In constructing this cylindrical locking member 12, its upper end would be constructed preferably rectangular in cross-section, and this rectangular portion which would be constructed during the course of the formation of the member, is to be provided with a part 13 extending at right angles to the body of the cylindrical member. Furthermore, said part terminates in a downwardly projecting lug 14 which extends in parallel relation to the body of the member, especially providing a hook, to engage over the spoke of the steering wheel as illustrated. This cylindrical locking member 12 at its other end is formed with a cylindrical opening 15 for the reception of the shackle of a padlock 16. When locking a steering wheel in the manner herein set forth, rigidity necessarily performs an important part, especially to resist any and all strains or forces, which may be exercised in an endeavor to turn the steering wheel. Consequently the necessary rigidity is afforded, particularly since the hook at the upper end of the member will resist any attempts to bend the hook, for the purpose of disengaging it from the spoke of the steering wheel, and furthermore, since the shackle of the padlock is immediately under and in contact with the lower edge of the eye 11, and by reason of the clamping members 8 and 9 being in firm contact with the steering post, there is no possible chance of the cylindrical locking member being moved vertically, that is so long as the shackle of the padlock is in engagement with the opening 15. It is to be noted that when the cylindrical locking member is not in use, the padlock having been detached and is carried in the operator's pocket or other suitable place, the cylindrical locking member may be moved vertically, the hook disengaged from the spoke, and then the cylindrical locking member is allowed to move downwardly through the cylindrical eye 11, until the lateral part 13 of the hook contacts with the eye. In this manner the cylindrical locking member is allowed to be conveniently carried on the steering post, without in any way causing its loss. The vibration of the car, as will be obvious, is not sufficient to cause the locking member to move far enough and upwardly vertically to cause its disengagement from the eye 11.

In the use of my invention, the members 8 and 9 are applied to and clamped upon the steering post 5 at the requisite distance below the wheel 6. When it is desired to lock the steering wheel against movement, the rod 12 is inserted downwardly through the eye 11, and the angular end portion 13 thereof engaged over and upon one of the spokes 7 of the wheel. The opposite end of said rod having the opening 15 therein, extends below the eye 11, and by then engaging the shackle of the padlock 16 through said opening and closing the shackle, the rod 12 will be securely held against upward vertical movement so that it will be impossible to disengage the angular end 13 of said rod from the spoke of the steering wheel. It will likewise be seen that by locking the steering wheel against rotation in this manner, the possibility of completely removing the wheel from the upper end of the steering rod or shaft is also obviated. The inner faces of the clamping members 8 and 9 are preferably roughened or corrugated so that the clamp cannot be shifted vertically upon the steering post.

The device as above described my be readily applied to various makes of motor vehicles, and if necessary in order to adapt the invention to a particular construction of steering post, additional openings 15 may be readily bored in the end portion of the locking rod 12. The device as a whole is relatively simple and can be easily and quickly applied to or removed from the vehicle. It is also reliable and efficient for the purpose in view, as well as strong and durable in practical use.

While I have herein shown and described the preferred construction and arrangement of the several elements employed, it is to be understood that the device is susceptible of considerable modification therein and I, therefore, reserve the privilege of adopting all such legitimate changes as may be fairly embodied within the spirit and scope of the invention as claimed.

I claim:—

The combination with a steering post having a steering wheel on its upper end, of a locking member anchoring means rigidly fastened to the steering post axially below the steering wheel, said anchoring means having a cylindrical eye offset laterally from the steering post, a cylindrical steering wheel locking member comprising a cylindrical rigid body passing through said eye and arranged in parallelism to the post and having an opening at its lower end immediately contiguous with and adjacent to the under part of the eye, the upper end of the cylindrical body terminating in a laterally extending rigid hook provided with a downwardly extending lug, which together with the body of the hook overhangs in a hooked engagement with the spoke of the steering wheel, and locking means having shackle engaging through the opening at the lower end of the body, whereby owing to the location of the opening, it may contact with the under edges of the eye, thereby affording a rigid lock for the steering wheel, said locking member when the locking means is detached, adapted to be moved vertically, whereby the hook is disengaged from the spoke, so that the member may be allowed to move downward through the eye until it engages with the eye to support the locking member in a non-used position.

In testimony whereof I hereunto affix my signature in the presence of two witnesses.

H. C. MILLER.

Witnesses:
JOHN T. McINTIRE,
ELIZABETH McINTIRE.